US009957443B2

(12) United States Patent
Youngblood et al.

(10) Patent No.: US 9,957,443 B2
(45) Date of Patent: May 1, 2018

(54) PHOSPHORYLATION OF PRODUCTS FOR FLAME RETARDANT APPLICATIONS

(71) Applicant: PURDUE RESEARCH FOUNDATION, West Lafayette, IN (US)

(72) Inventors: Jeffrey Paul Youngblood, Crawfordsville, IN (US); John Alan Howarter, West Lafayette, IN (US); Gamini Patrick Mendis, Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 168 days.

(21) Appl. No.: 15/016,313

(22) Filed: Feb. 5, 2016

(65) Prior Publication Data

US 2016/0230097 A1    Aug. 11, 2016

Related U.S. Application Data

(60) Provisional application No. 62/112,200, filed on Feb. 5, 2015.

(51) Int. Cl.
C09K 21/14 (2006.01)
C07G 1/00 (2011.01)
C09K 21/12 (2006.01)

(52) U.S. Cl.
CPC ............... *C09K 21/14* (2013.01); *C07G 1/00* (2013.01); *C09K 21/12* (2013.01)

(58) Field of Classification Search
None
See application file for complete search history.

(56) References Cited

U.S. PATENT DOCUMENTS

| 4,729,817 A * | 3/1988 | Francis | D21C 9/1005 |
| | | | 162/65 |
| 5,741,814 A * | 4/1998 | Nakajima | C07C 43/21 |
| | | | 514/411 |
| 6,624,258 B1 | 9/2003 | Nikkeshi | |
| 8,747,709 B2 * | 6/2014 | Brizius | C08H 6/00 |
| | | | 106/18.14 |
| 8,796,363 B2 * | 8/2014 | Harada | C08L 67/04 |
| | | | 524/73 |
| 8,822,712 B1 | 9/2014 | Doll et al. | |
| 2008/0076833 A1 | 3/2008 | Van Brussel et al. | |
| 2008/0095866 A1 | 4/2008 | Declercq et al. | |
| 2009/0247490 A1 * | 10/2009 | Declercq | A61K 31/66 |
| | | | 514/107 |
| 2011/0028437 A1 * | 2/2011 | Robbins | A61K 31/665 |
| | | | 514/100 |
| 2013/0292615 A1 | 11/2013 | Brizius | |

(Continued)

OTHER PUBLICATIONS

De Chirico, A. et al., "Flame retardants for polypropylene based on lignin." Polymer Degradation and Stability 79 (2003) 139-145.

(Continued)

*Primary Examiner* — Joseph D Anthony
(74) *Attorney, Agent, or Firm* — Purdue Research Foundation; Zhigang Rao

(57) ABSTRACT

Disclosed herein are flame retardant materials, and in particular materials and processes for phosphorylating materials for flame retardant applications.

4 Claims, 18 Drawing Sheets

(56) References Cited

U.S. PATENT DOCUMENTS

2013/0317138 A1* 11/2013 Harada ............... C08L 67/04
 524/73
2014/0235132 A1* 8/2014 Brizius ............... C08H 6/00
 442/414
2014/0249255 A1 9/2014 Harada et al.

OTHER PUBLICATIONS

Pouteau, C., et al., "Lignin-polymer blends: evaluation of compatibility by image analysis." C. R. Biologies 327 (2004) 935-943.
Bernier, E., et al., "Life cycle assessment of kraft lignin for polymer applications." Int J Life Cycle Assess (2013) 18:520-528.
Hilburg, S.L. et al., "A universal route towards thermoplastic lignin composites with improved mechanical properties." Polymer 55 (2014) 995-1003.
Cowan, J.C. et al., "Copper-Hydrogenated Soybean and Linseed Oils: Composition, Organoleptic Quality and Oxidative Stability" J. Am. Oil Chem. Soc. 1973, 50, 132-136.

* cited by examiner

US 9,957,443 B2

PHOSPHORYLATION OF PRODUCTS FOR FLAME RETARDANT APPLICATIONS

CROSS-REFERENCE TO RELATED APPLICATIONS

The present U.S. patent application is related to and claims the priority benefit of U.S. Provisional Patent Application Ser. No. 62/112,200, filed Feb. 5, 2015, the contents of which is hereby incorporated by reference in its entirety into this disclosure.

STATEMENT OF GOVERNMENT INTEREST

This invention was made with government support under DGE 1144843 awarded by the National Science Foundation, and 09-JV-11111137-151 awarded by the U.S. Department of Agriculture. The government has certain rights in the invention.

TECHNICAL FIELD

The present disclosure generally relates to flame retardant materials, and in particular to materials and processes for phosphorylating materials for flame retardant applications.

BACKGROUND

This section introduces aspects that may help facilitate a better understanding of the disclosure. Accordingly, these statements are to be read in this light and are not to be understood as admissions about what is or is not prior art.

Current polymer flame retardant technologies consist mainly of halogenated moieties. Examples include brominated flame retardants. Health and environmental concerns have been raised about such substances. There is therefore an unmet need for alternative substances for flame retardant systems, especially in industrial applications.

SUMMARY

In one aspect, a method for producing flame retardant additives is presented, which includes the step of phosphorylating a carbon-containing material. The method can also include the step of phosphorylating the carbon-containing material to increase char formation. The carbon-containing material can be oil and/or tannin and/or lignin.

In another aspect, a phosphorylated product is presented, which is prepared by a process that includes the step of phosphorylating a carbon-containing material. The carbon-containing material can be oil and/or tannin and/or lignin.

In yet another aspect, a flame retardant is presented, which includes phosphorous and a carbon-containing compound, wherein the carbon-containing compound is phosphorylated to increase char formation. The carbon-containing compound can be oil and/or tannin and/or lignin. The lignin is a phosphorylated lignin.

DETAILED DESCRIPTION

Figure 1A:
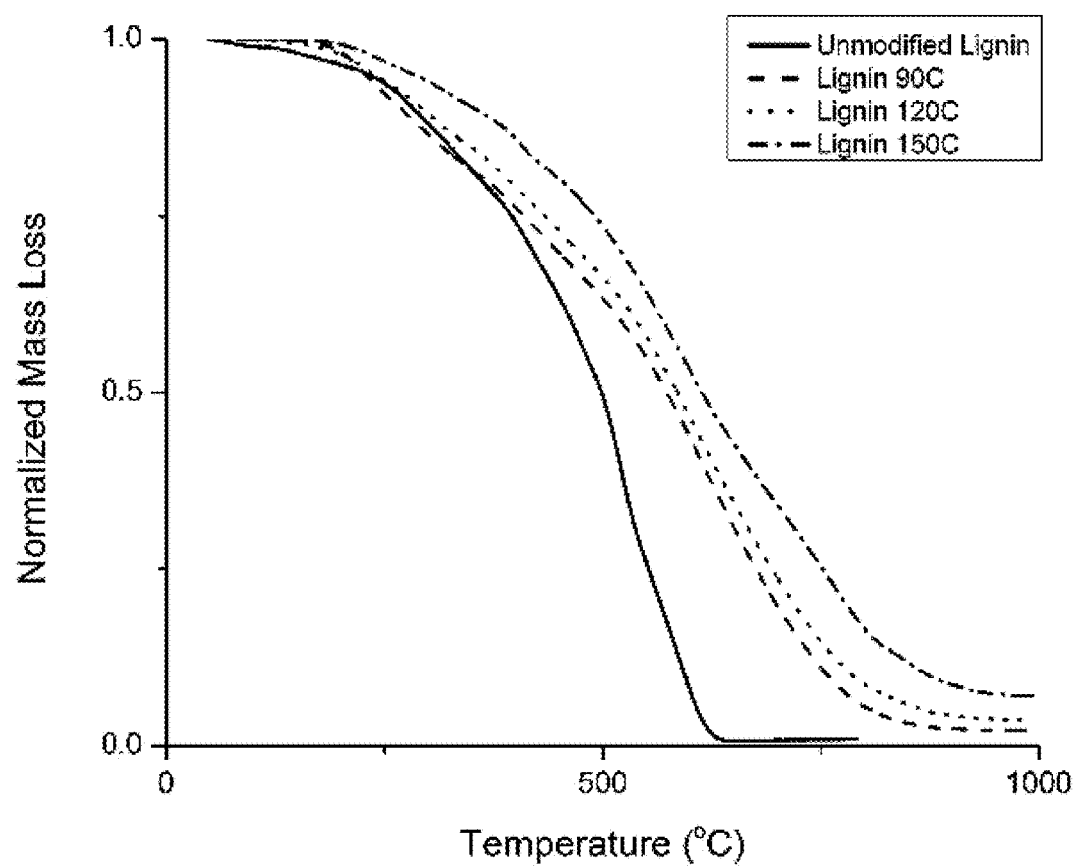
FIG. 1A shows lignin char formation as a function of reaction temperature.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In response to the unmet need for alternative substances for use in flame retardant technologies, natural and non-natural products have been investigated as renewable feedstocks. The natural and non-natural products are herein the starting materials that are then phosphorylated to produce phosphorylated materials that can be used for flame retardant technologies. These starting materials are carbon-containing materials. Examples of the starting materials include lignin, tannins, such as tannic acid, natural oils, non-natural tannins and non-natural tannic acid (for example, tannic acid produced from petroleum), and non-natural oils. For the purposes of the present disclosure, "natural" refers to materials occurring in nature. "Non-natural" refers to materials not necessarily occurring in nature and features at least one man-made component. Such examples have chemical functionalities and potential for char formation. Chemical modifications may be necessary in order to increase flame retardancy and chemical compatibility with polymer systems.

As further described below, lignin is a bioderived phenolic macromolecule and a viable filler material. Further, lignin has been shown to enhance char formation.

Figure 1B:
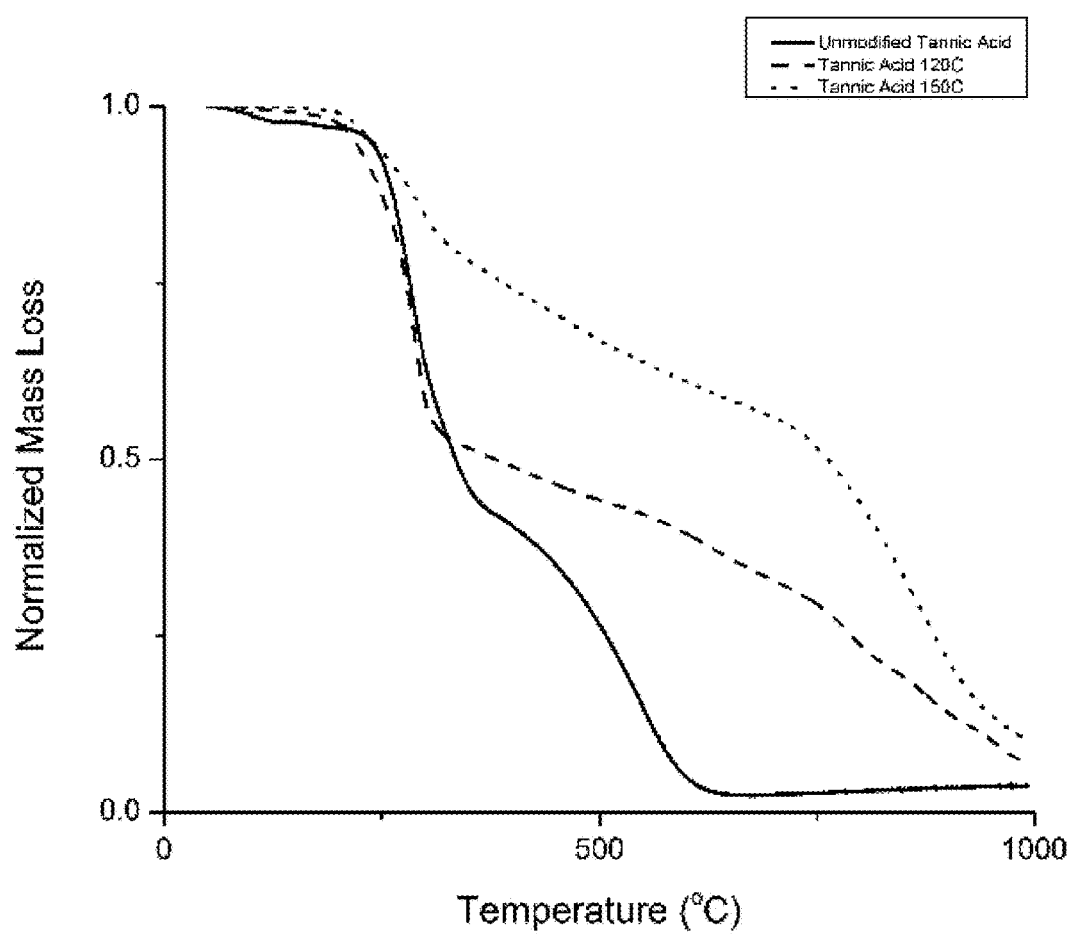
FIG. 1B shows tannic acid char formation as a function of reaction temperature.

In addition to lignin, tannins and linseed oil can be chemically modified to enhance char formation. As demonstrative of the herein described materials and processes, modified products were characterized using techniques that include nuclear magnetic resonance spectroscopy, thermogravimetric analysis, and fourier transform infrared spectroscopy to determine the extent of modification and chemical changes during char formation and decomposition. FIG. 1A shows lignin char formation as a function of reaction temperature. FIG. 1B shows tannic acid char formation as a function of reaction temperature. The natural products can be incorporated into polymers and the flame retardant characteristics can be characterized using limiting oxygen index and vertical burn tests.

EXAMPLE 1

Formation of Chatechol from Guaiacol

Figure 2:
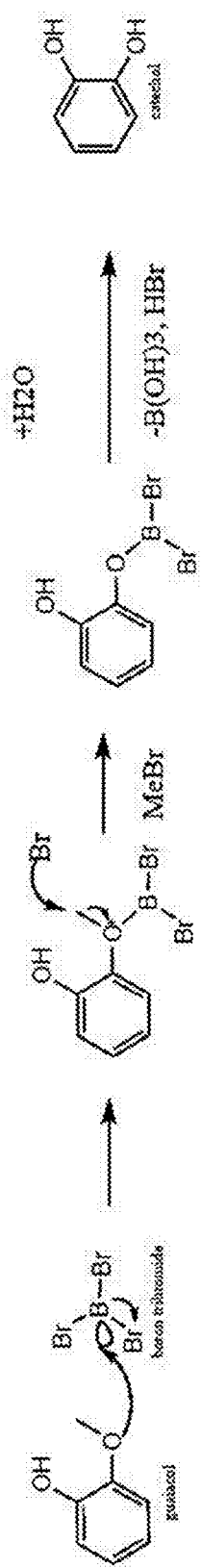
FIG. 2 shows part 1 of a two-step reaction which will demethoxylate the methoxy group of the guaiacol using boron tribromide, protonate the phenoxide, then phosphinate both phenolic groups on the molecule using triphenyl phosphate.

To demonstrate the principles described herein, Guaiacol is being used as a "lignin model compound" because it contains both methoxy and hydroxyl functionalities. This is part 1 of two-step reactions which will demethoxylate the methoxy group of the guaiacol using boron tribromide, protonate the phenoxide, then phosphinate both phenolic groups on the molecule using triphenyl phosphate, as shown in FIG. 2.

Glassware will first be washed with soap and DI water, then heated in an oven at 130° C. for 1 hour to evaporate any water. The condenser, thermometer and the septa will be connected to the three-necked flask while still warm to prevent water contamination. The septa at the top of the condenser will have a cannula for venting gas.

The three necked flask and condenser was placed in a sandbath and mounted in clamps. Water was allowed to flow through the condenser. The end of the cannula leading from the condenser was placed in the Erlenmeyer Flask with water and methylene red. $N_2$ gas was flowed into the three necked flask, until the cannula in the flask with the methylene red solution began to vent $N_2$. In a separate round-bottom flask, a solution was made of guaiacol in xylene which was then heated to 100° C. Light vacuum was pulled on the solution and $N_2$ gas was pumped back in three times, to remove water vapor. After removal of water, an amount of solution was added to the three necked flask. $BBr_3$ was added, and when necessary, the solution was heated to reflux. As needed, the indicator solution was replaced. When the color of the indicator solution remained stable for an hour, DI $H_2O$ was added to protonate the solution. A small amount of indicator was added to part of the solution to determine pH. The solution was precipitated in cold hexanes.

Figure 3:
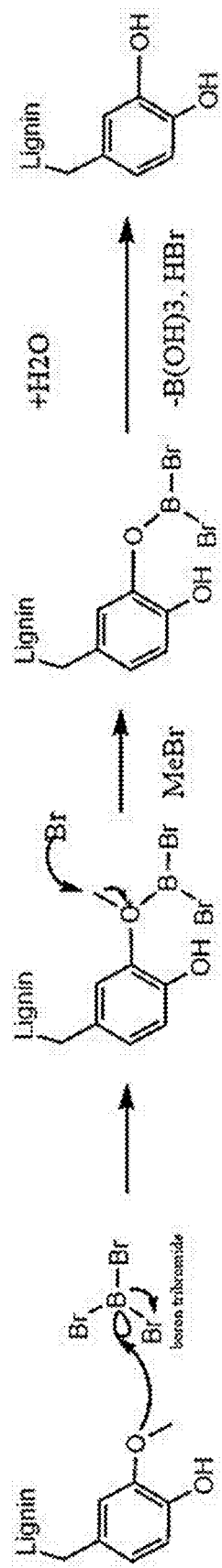
FIG. 3 shows the $BBr_3$ demethoxylation of lignin.

FIG. 3 shows the $BBr_3$ demethoxylation of lignin.

A 500 mL roundbottom flask was cooled in an ice bath to −4° C. Lignin (2 g, dried at 130° C. for 2 hours) was placed in the roundbottom flask and 42 g anhydrous dichloromethane was added—the lignin did not dissolve completely in the dichloromethane. Nitrogen gas was flowed through the roundbottom and the exhaust gasses were vented through water with a small amount of methyl red, used to indicate pH. 5 mL of $BBr_3$ was added dropwise to the lignin-dichloromethane solution using a cannula. Upon addition, methyl bromide gas was created, and the vessel became pressured. The reaction was allowed to continue over night, and DI water was added to kill the reaction. The addition of water should create $B(OH)_{3,(aq)}$ and $HBr_{(aq)}$.

EXAMPLE 2

Formation of Triphenyl Phosphate from Diphenyl Phosphoryl Chloride and Phenol

Figure 4:
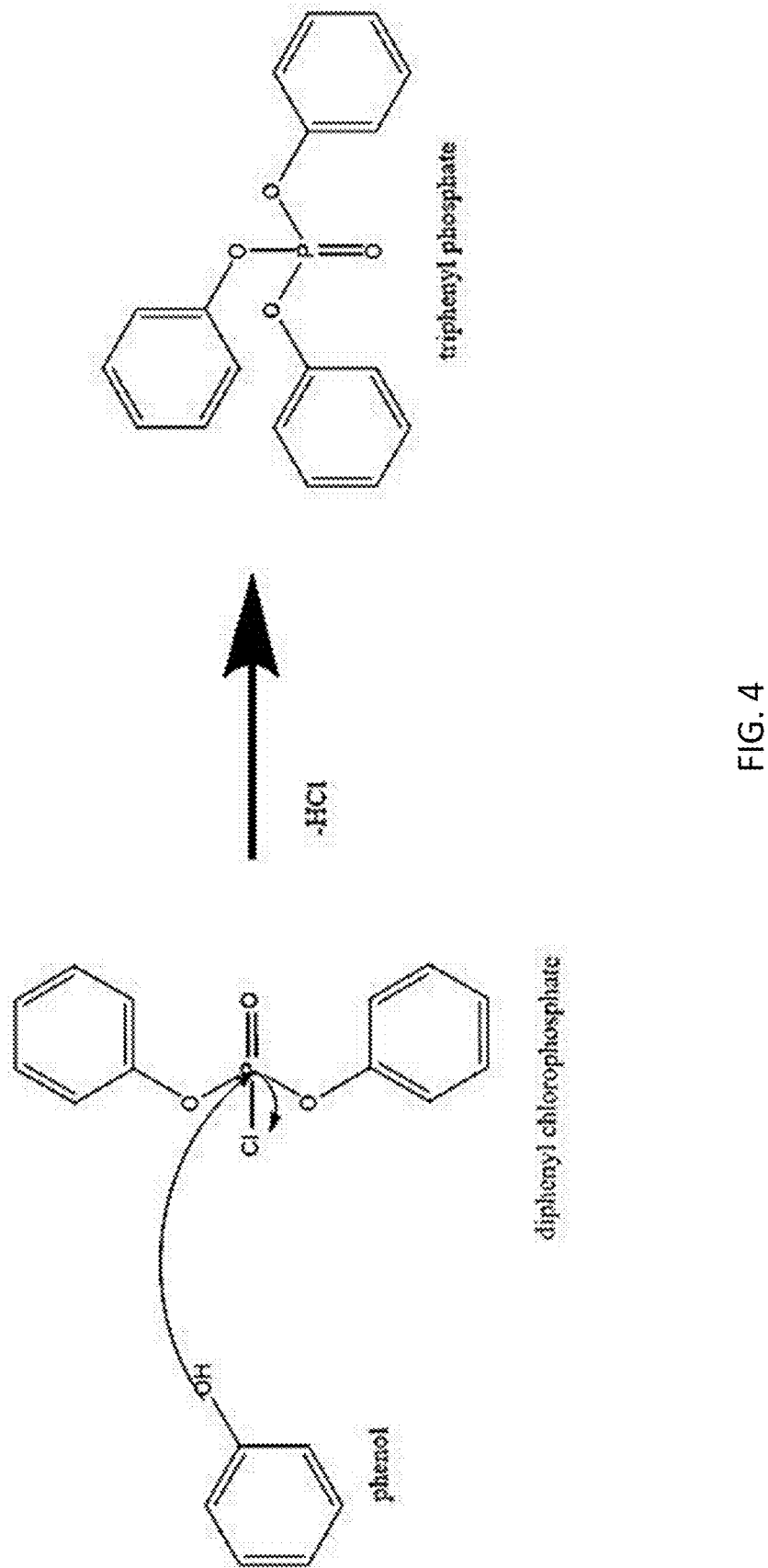
FIG. 4 shows phenol as used as a lignin "model compound" in one embodiment of the present disclosure.

This example serves to exemplify how it is determined whether the reaction of diphenyl phosphoryl chloride and phenol results in a pure triphenyl phosphate product. Phenol is being used as a lignin "model compound" in this embodiment of the experiment, as shown in FIG. 4. In other embodiments, 4-methoxyphenol is used as a more accurate lignin model compound. Demethylation and subsequent phosphination will also be performed on the 4-methoxyphenol. Comparison of the flame retardancy between these compounds and the phosphinated lignin will be made.

First, 2.068 g (0.022 mol eq) phenol was dispensed in a clean, heat treated 100 mL round bottom flask. A Liebig condenser was attached to the flask with a rubber stopper and $N_2$ gas was bubbled into the solution for 30 minutes (arbitrary time) as the phenol (mp 40° C.) is heated to 50° C. The gas was flowed out using a cold trap to condense any gasses which travel with the $N_2$, and a bubbler was used to prevent oxygen contamination. Next, 20 g (arbitrary volume) of anhydrous toluene was added to the flask through the rubber stopper using a needle and the solution was allowed to mix for 30 minutes (the 30 minutes was an arbitrarily set time). Then 5.36 g (0.02 mol eq) of diphenyl phosphoryl chloride was added dropwise to the flask at a rate of 1.5 g/min. HCl gas was evolved from the solution upon addition of the diphenyl phosphoryl chloride. This gas was refluxed using a Liebig condenser topped with a rubber stopper. Upon complete reaction of the phenol with the diphenyl phosphoryl chloride, the Liebig condenser was turned off and the solution was heated to 130° C. for 2 hours (estimated) to evaporate the toluene (bp 110° C.), phenol (181.7° C.) and HCl. The excess liquids were condensed in an Erlenmeyer flask for disposal and diluted with water until neutral and put in a waste container for disposal. The product was slowly cooled to room temperature. The product, triphenyl phosphate, may crystallize upon removal of the toluene. If this does not occur, then acetone was used to solvate the triphenyl phosphate, which will then evaporate at STP. NMR of triphenyl phosphate product dissolved in acetone/dichloromethane was compared to standard triphenyl phosphate from sources such as Sigma Aldrich.

Figure 5:
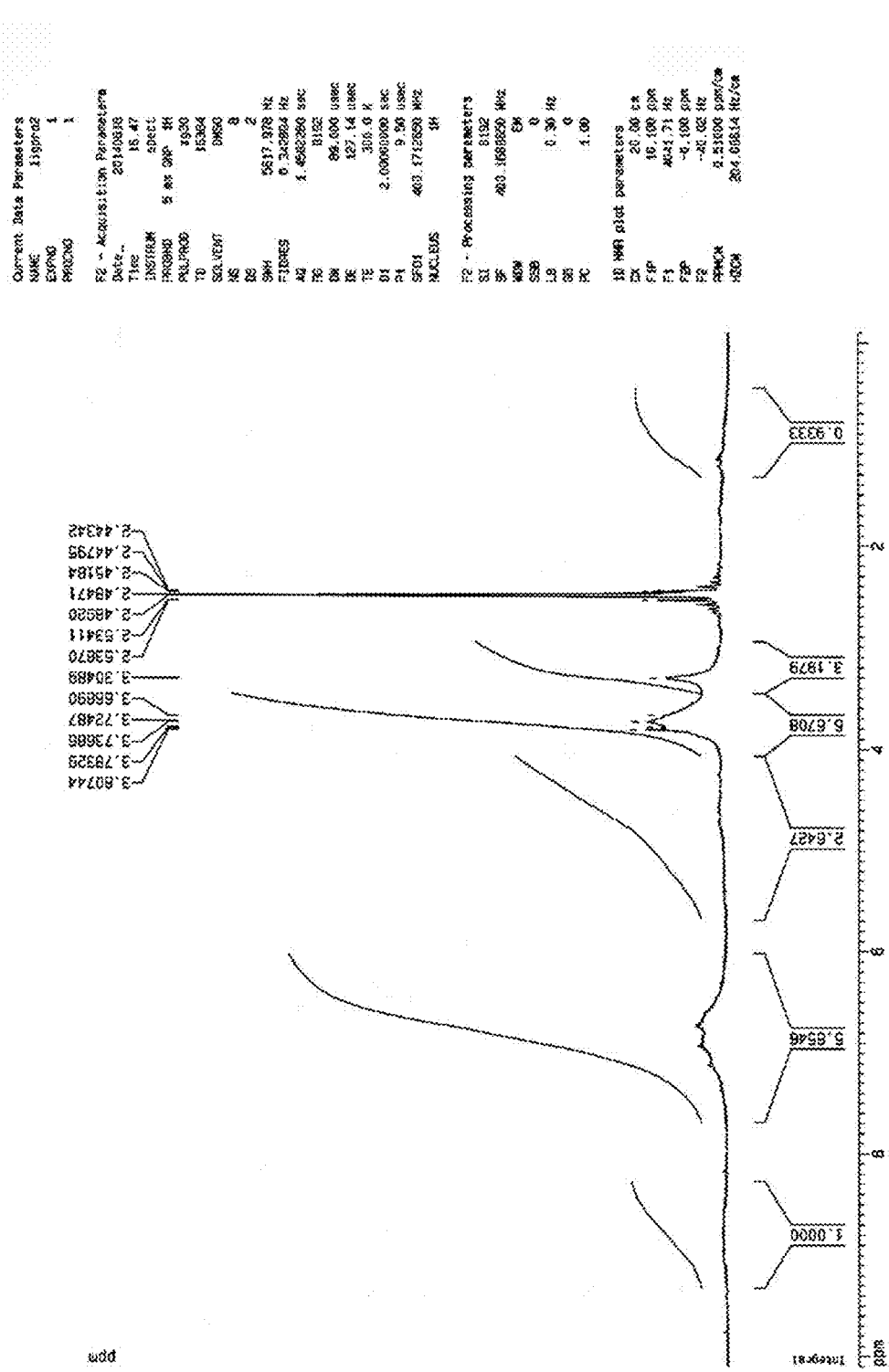
FIG. 5 shows a NMR image of neat lignin.
Figure 6:
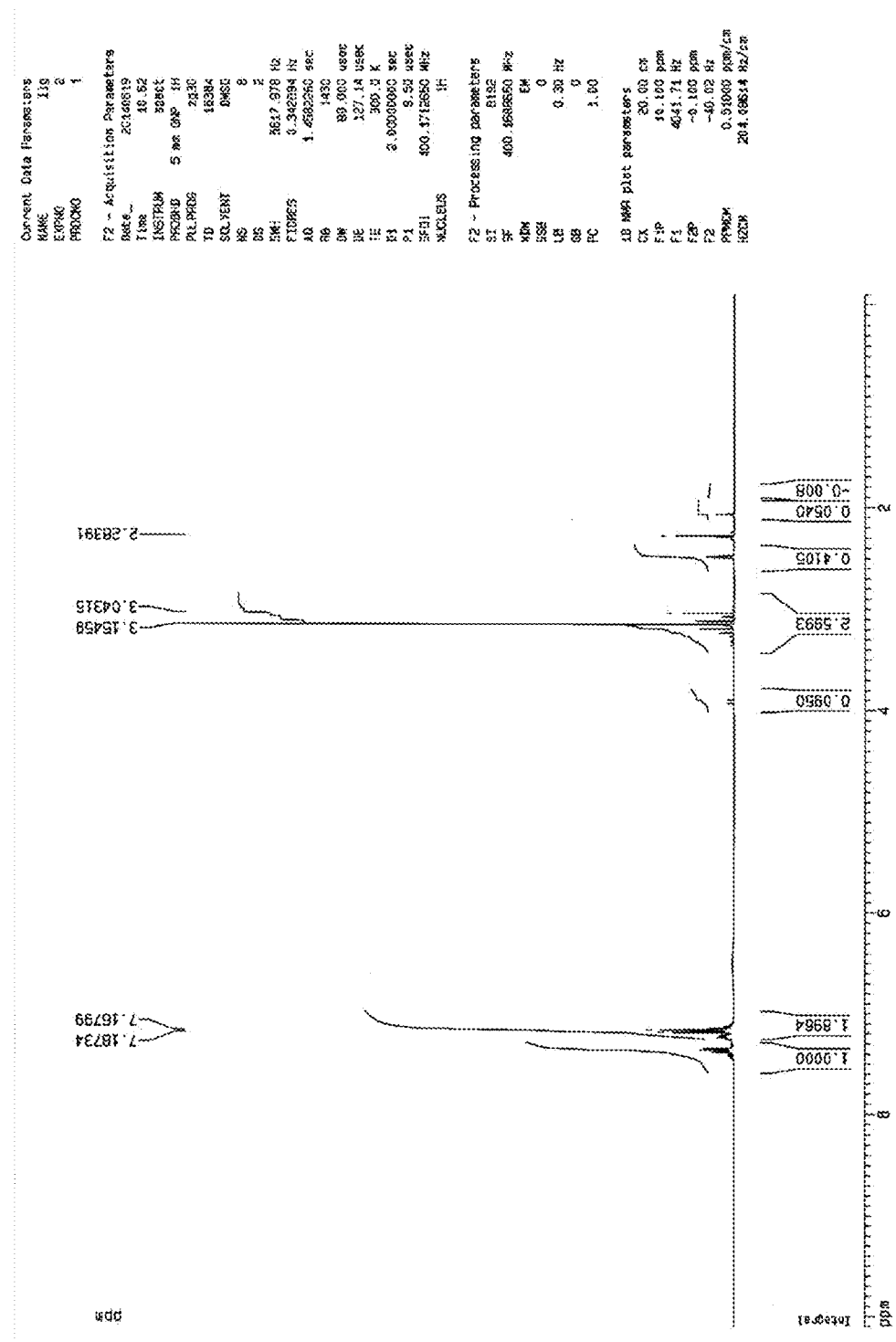
FIG. 6 shows a NMR image of diphenyl phosphoryl chloride excess from phosphatization.
Figure 7:
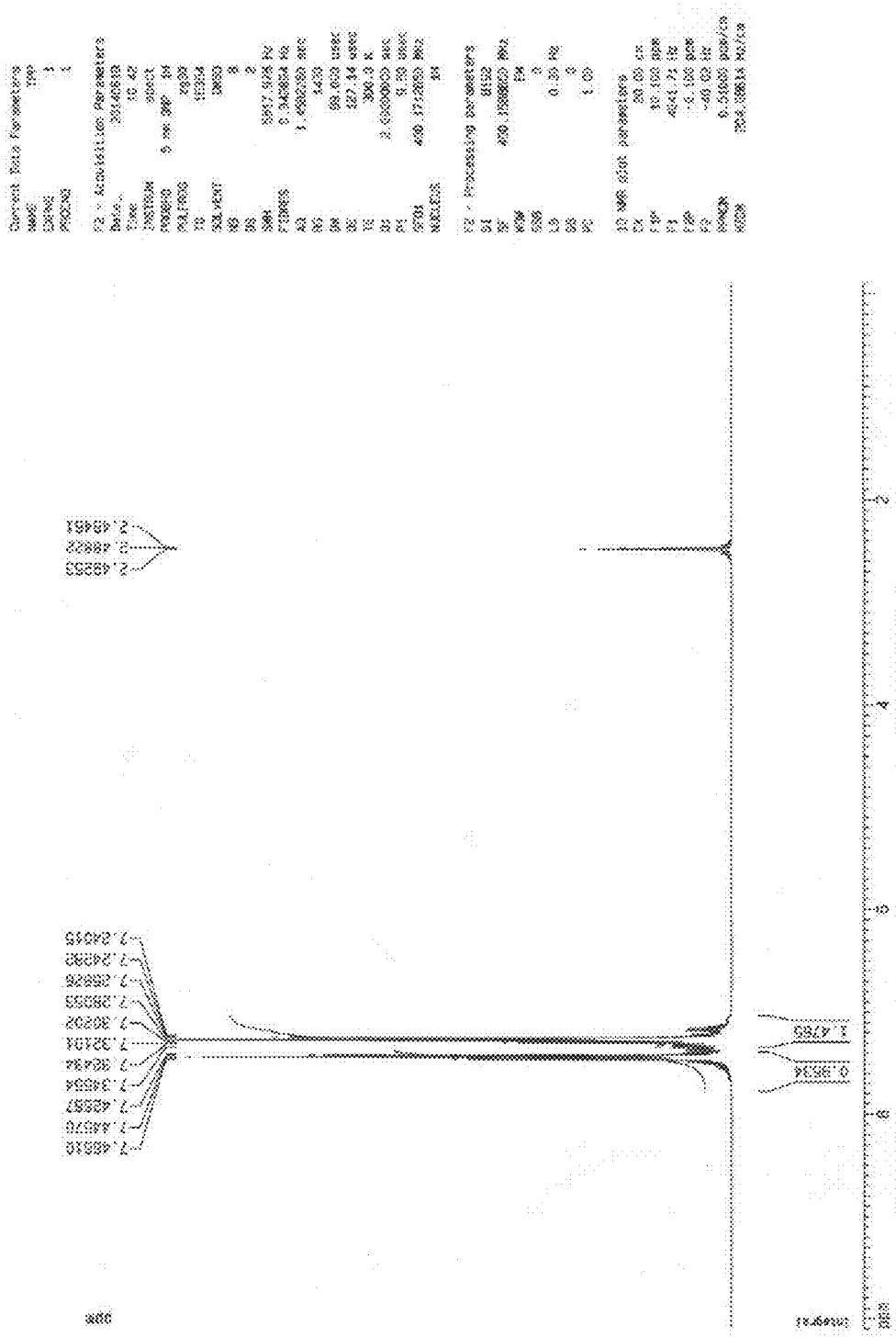
FIG. 7 shows a NMR image of triphenyl phosphate from phenol.
Figure 8:
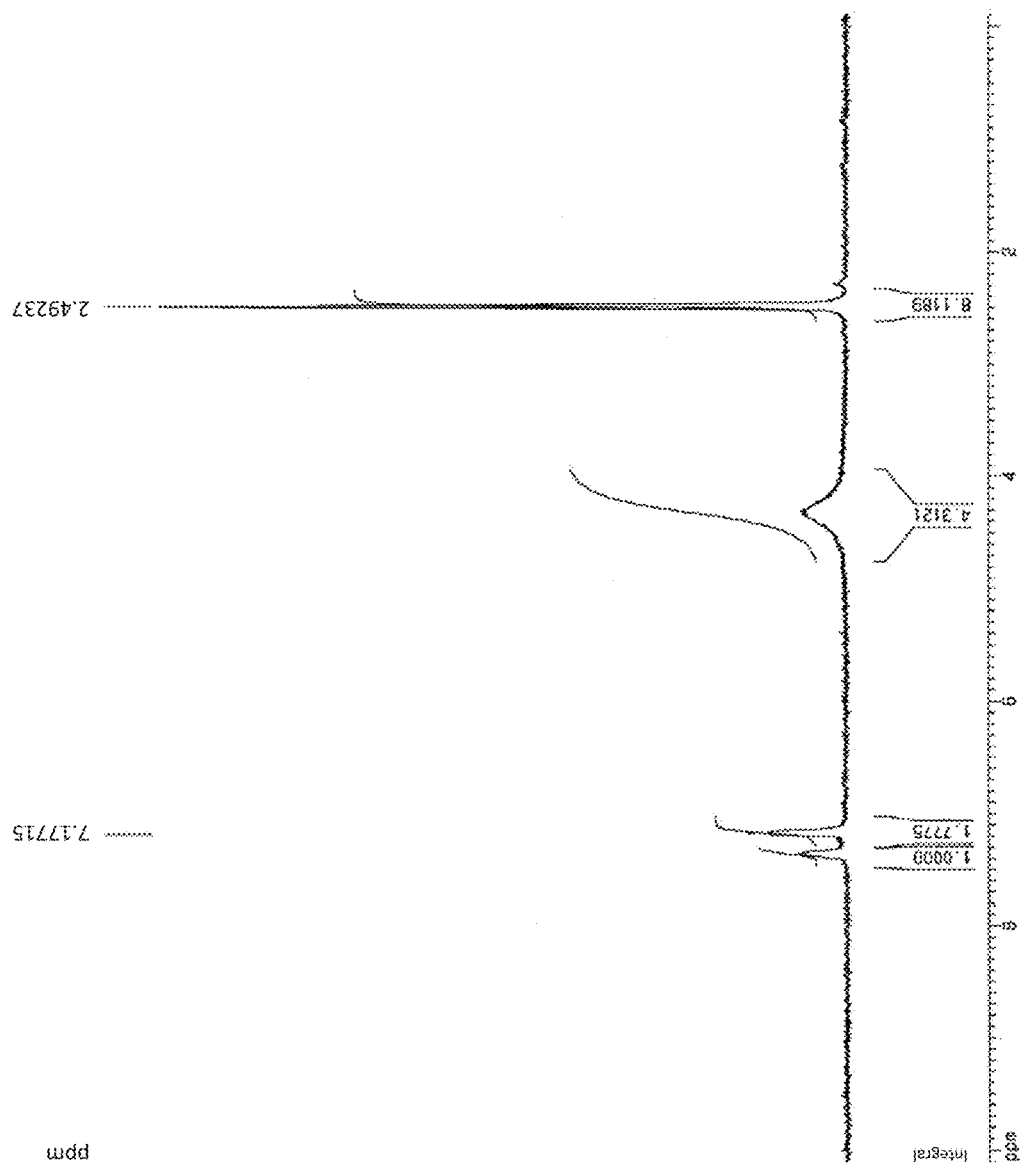
FIG. 8 shows a NMR image of phosphated $BBr_3$ lignin.

Nuclear Magnetic Resonance Imaging (NMR):

It should be noted that phosphate lignin does not go into solution, and excess diphenyl phosphoryl chloride does go into solution. Therefore, phosphate lignin does not show the lignin signal in a NMR reading. FIG. 5 shows a NMR image of neat lignin. FIG. 6 shows a NMR image of diphenyl phosphoryl chloride excess from phosphatization. FIG. 7 shows a NMR image of triphenyl phosphate from phenol. FIG. 8 shows a NMR image of phosphated $BBr_3$ lignin.

Figure 9:
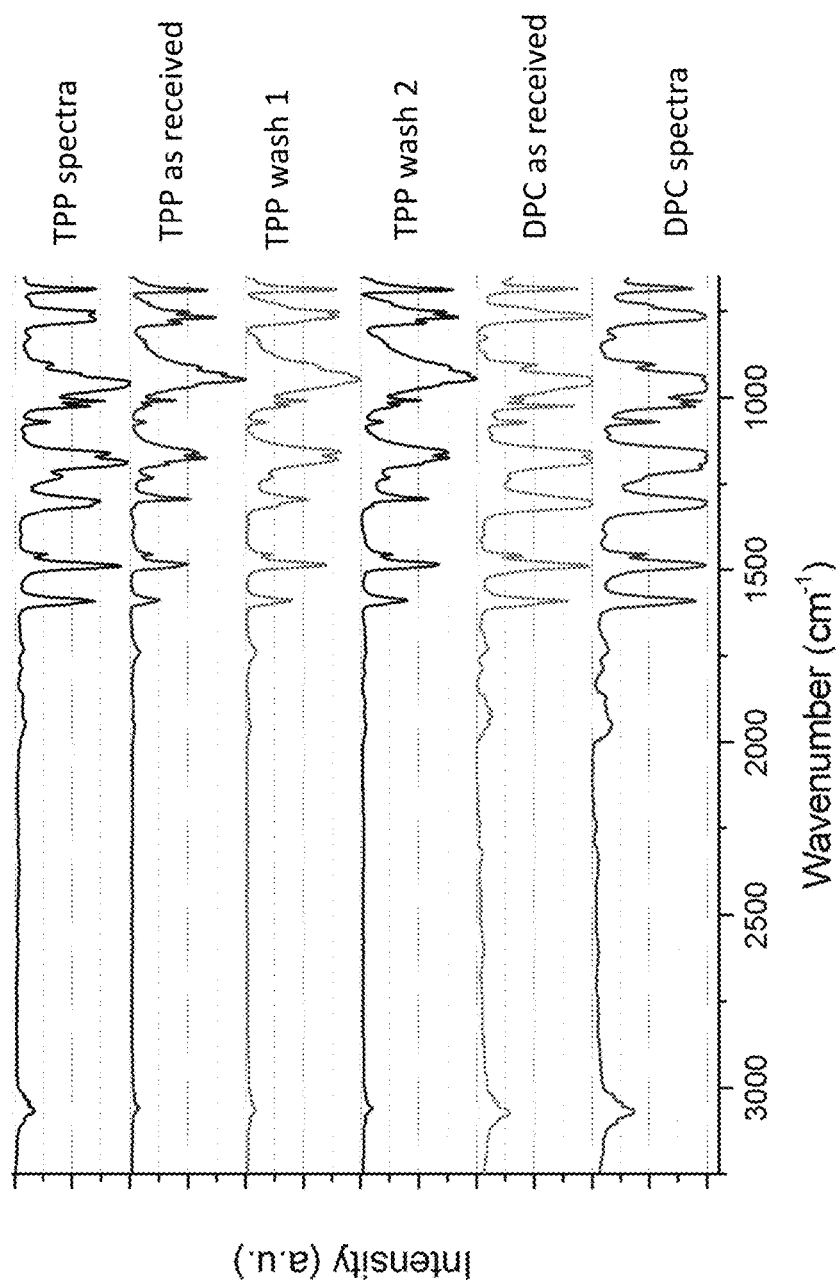
FIG. 9 shows a FTIR image of triphenyl phosphate from phenol.
Figure 10:
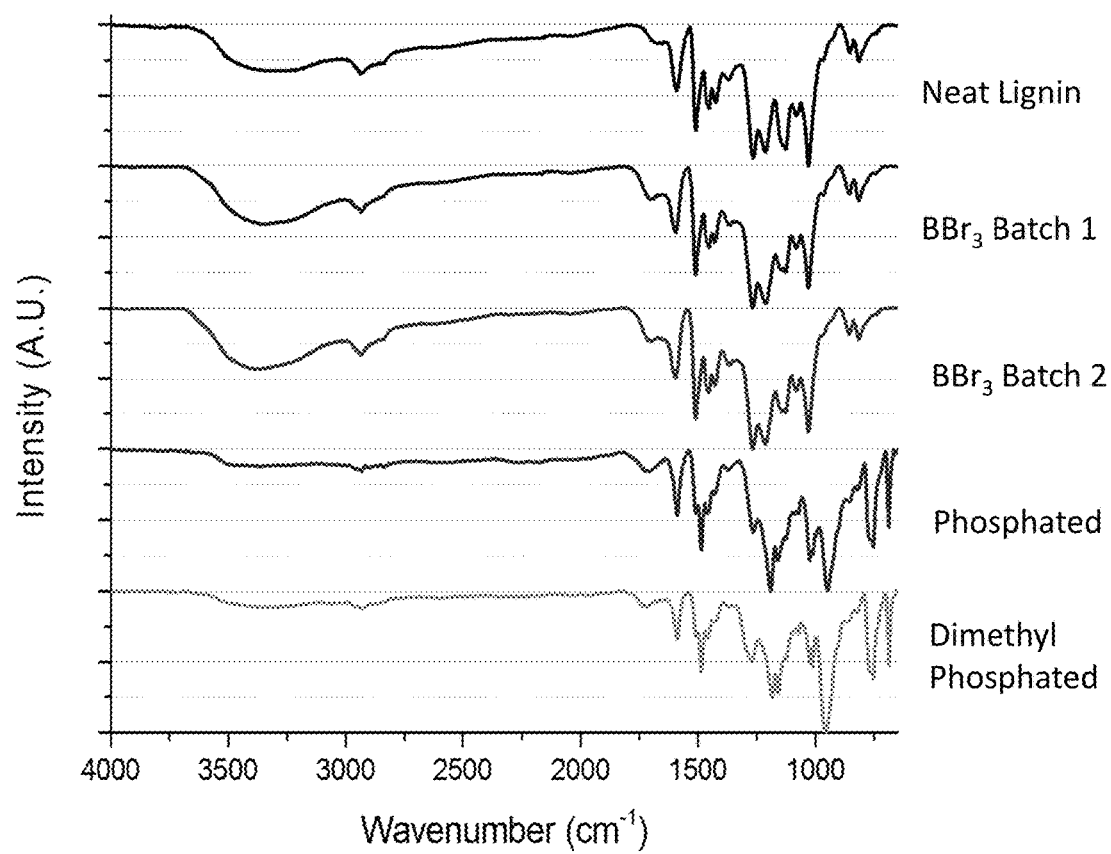
FIG. 10 shows a FTIR image of modified lignin.

Fourier Transform Infrared Spectroscopy (FTIR):

FIG. 9 shows a FTIR image of triphenyl phosphate from phenol. FIG. 10 shows a FTIR image of modified lignin.

Figure 11:
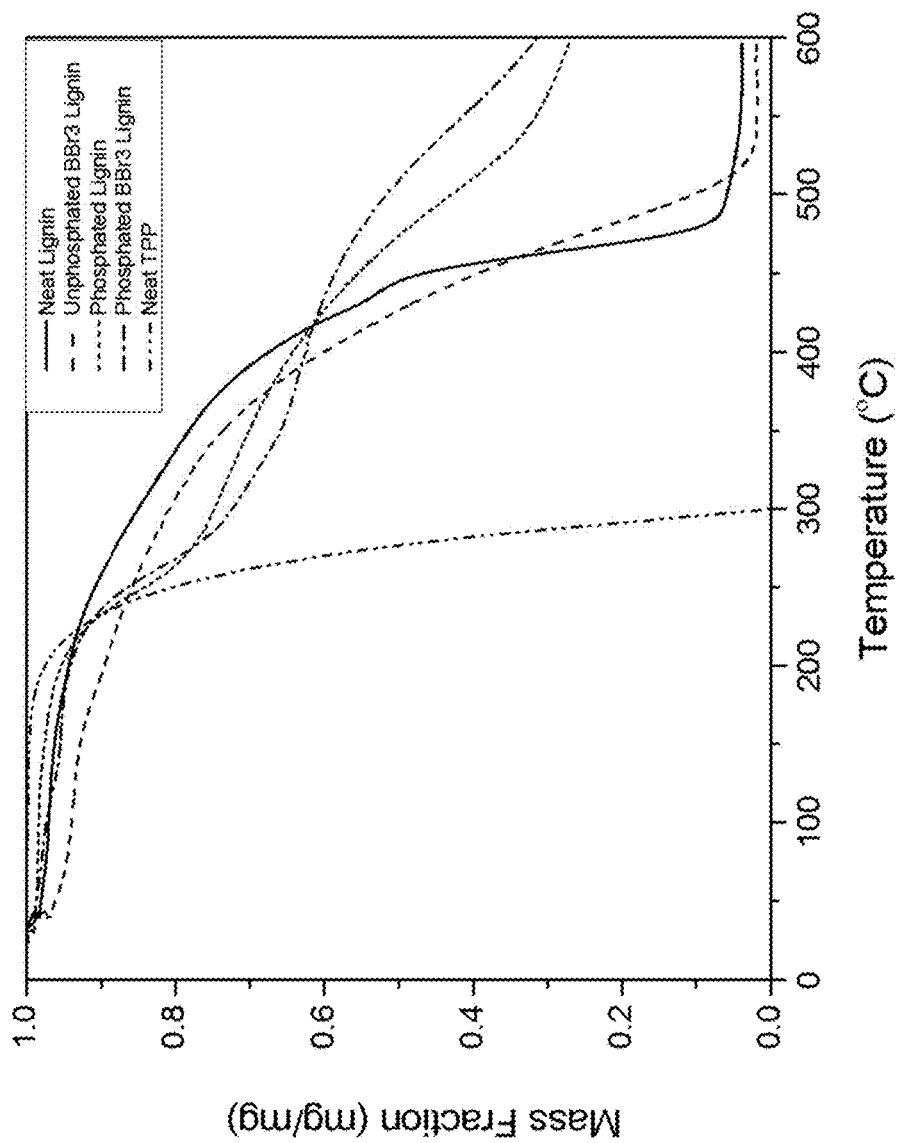
FIG. 11 is a TGA image of modified lignin in air.
Figure 12:
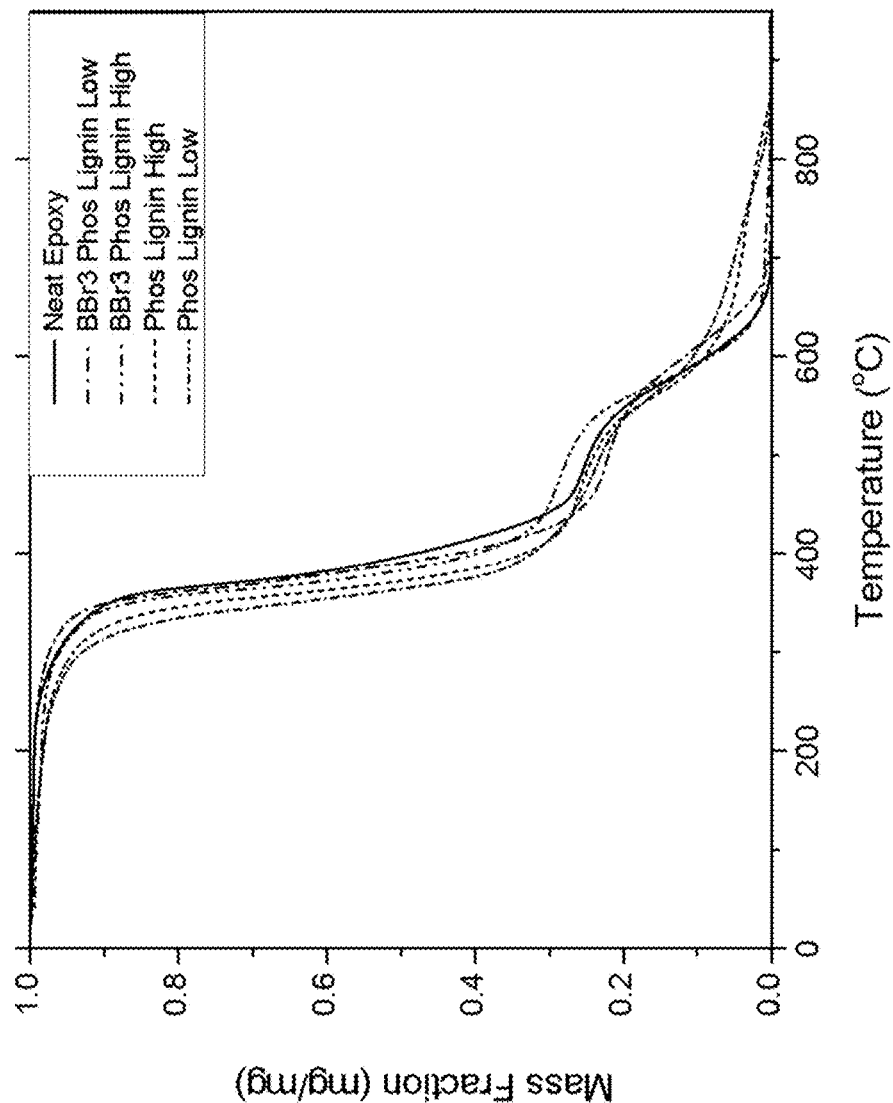
FIG. 12 is a TGA image of epoxy with modified lignin in air.

Thermal Gravimetric Analysis (TGA):

FIG. 11 is a TGA image of modified lignin in air. FIG. 12 is a TGA image of epoxy with modified lignin in air.

LOI:

Table 1 shows the results of oxygen index tests.

TABLE 1

Results of Oxygen Index Tests
Oxygen Index Tests

| Specimen | Oxygen Level | Observation | Oxygen Index |
|---|---|---|---|
| Neat epoxy | 24.2 | Out at 11 s | OI~24.3 |
| Immediate | 22.0 | Out at 1:26 m:s | 22.0 < OI ≤ 22.8 |
| 12, 12 | 24 | Out at 27 s | 24.0 < OI ≤ 25.1 |
| Low concentration Mannich | 21.1 | Out at 27 s | 21.1 < OI ≤ 22.0 |
| Neat epoxy | 25.5 | Burning at 3 m | OI < 25.5 |
| Immediate | 24 | Burning at 3 m | OI < 24 |
| 12, 12 | 24 | Out at 27 s | 24 < OI < 30 |
|  | 30 | 50 mm at 2:00 m:s |  |
| Low concentration Mannich | 25.5 | Burning at 3 m | OI < 25.5 |
| Neat epoxy | 25.5 | Burning at 3 min. | OI ≤ 25.5* |
| Immediate | 22.0 | Out at 1:26 m:s | 22.0 < OI ≤ 22.8** |
| 12, 12 | 24 | Out at 27 s | 24.0 < OI ≤ 25.1** |
| Low concentration Mannich | 25.5 | Burning at 3 m | OI < 25.5* |

EXAMPLE 3

Modified Lignin in Epoxy

Figure 13B:
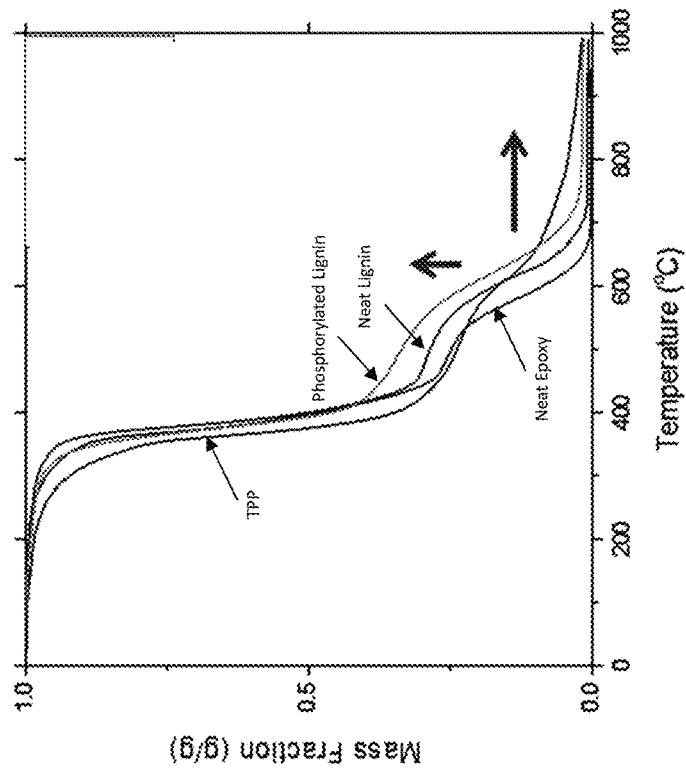
FIG. 13B shows mass fraction versus temperature for modified lignin in epoxy.
Figure 13A:
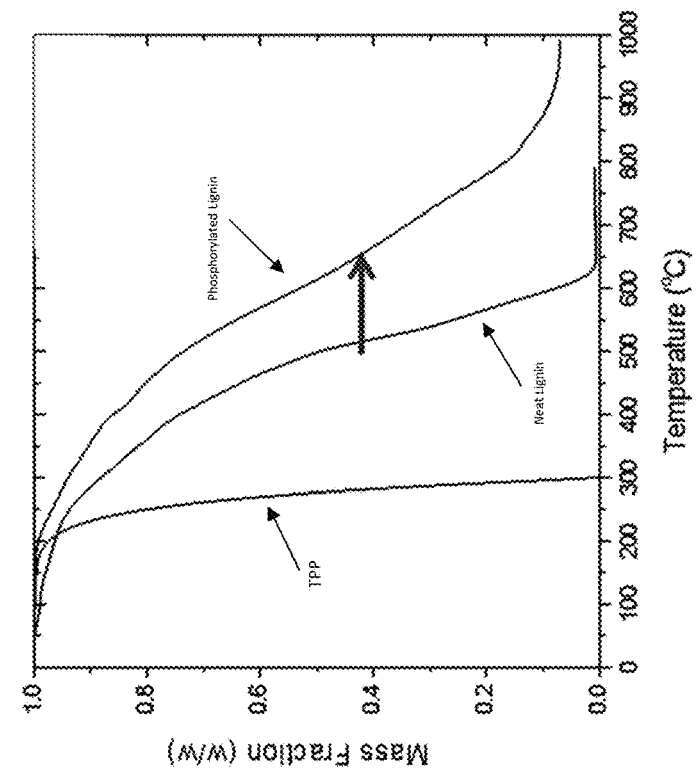
FIG. 13A shows mass fraction versus temperature for modified lignin

As exemplary of lignin enhancing char formation, FIG. 13A shows mass fraction versus temperature for modified lignin. Still referring to FIG. 13A, a shift in degradation by approximately 150° C. is observed for phosphorylated lignin. FIG. 13B shows mass fraction versus temperature for modified lignin in epoxy, with a 20 volume % filler (tests were completed in air). Still referring to FIG. 13B, phosphorylated lignin exhibits stable char residue at 1000° C.

Following is the procedure used for sample fabrication. Referring to Table 2, filler was massed out in Flack Tech container, then DGEBA was massed into same container. Filler was then mixed with epoxy in a Flack Tech 2×30 seconds at 2000 rpm. TETA was massed into pre-mixed epoxy. The sample was mixed in Flack Tech 2× (2×30 seconds at 2000 rpm+30 sec in ice bath). The sample massed into three silicone molds (roughly 90 g each, dependent on density), and then cured at room temperature for 12 hours, then held at 100° C. for 2 hours, 120° C. for 2 hours, and cooled to 80° C. over 2 hours. The sample was cut using abrasive saw and ground to appropriate thickness using grinding belts.

Mass loss calorimetry flame tests were conducted at 35 W/m$^2$. Sample dimensions were 100 mm×100 mm×5.8±0.3 mm. Relative humidity was 31%. The tests were stopped when the mass loss was less than 2.5 g/s. It should be noted that although 20 vol % filler loadings were used for demonstrative purposes, such percentage is not intended to be limiting, and rather, any amount of at least 0 vol % is applicable to this disclosure.

TABLE 2

Filler Loadings

| Sample Name | Filler loading |
|---|---|
| Neat Epoxy | — |
| TPP (triphenyl phosphate) | 20 vol % |
| Neat Lignin | 20 vol % |
| Phos. Lignin | 20 vol % |

Figure 14:
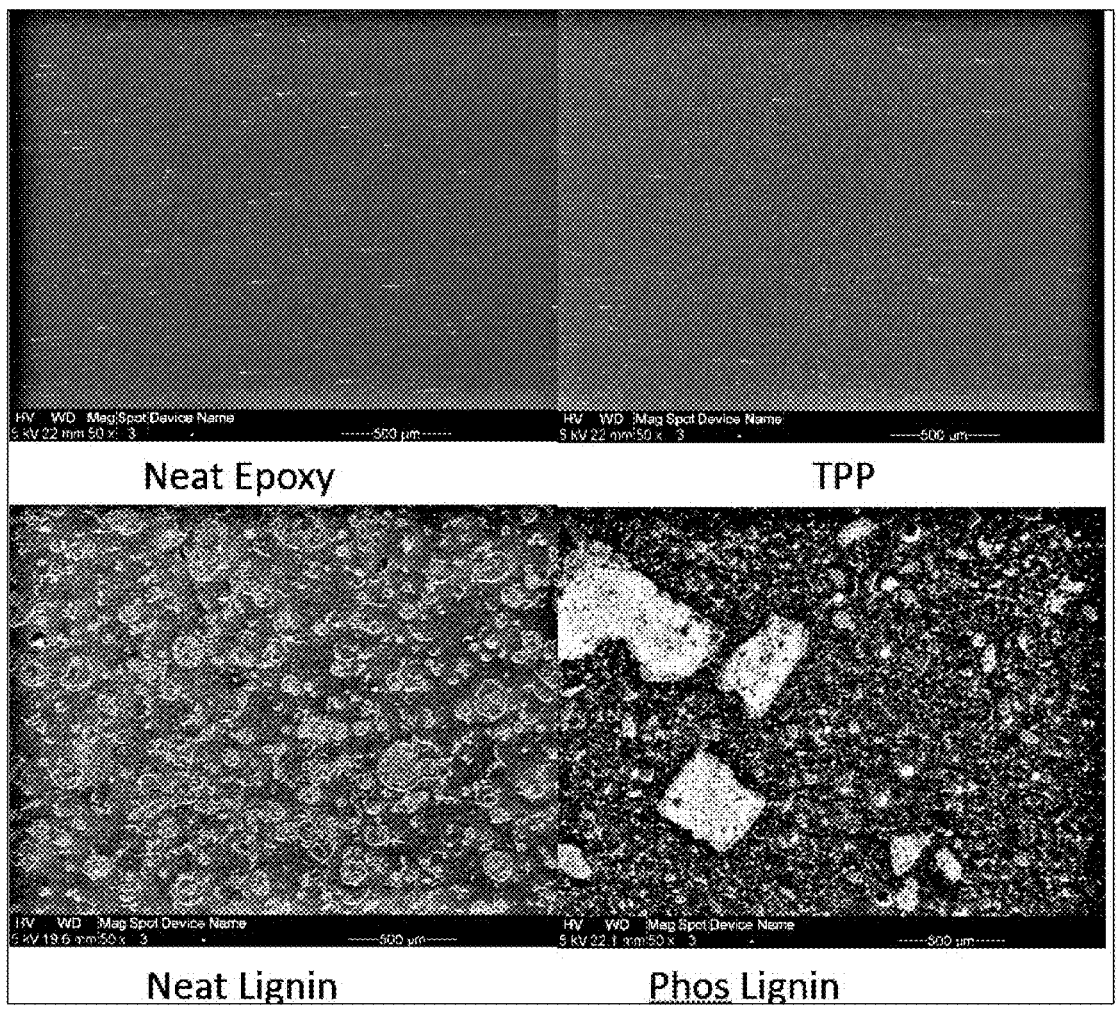
FIG. 14 shows images of lignin agglomerates in epoxy.
Figure 15:
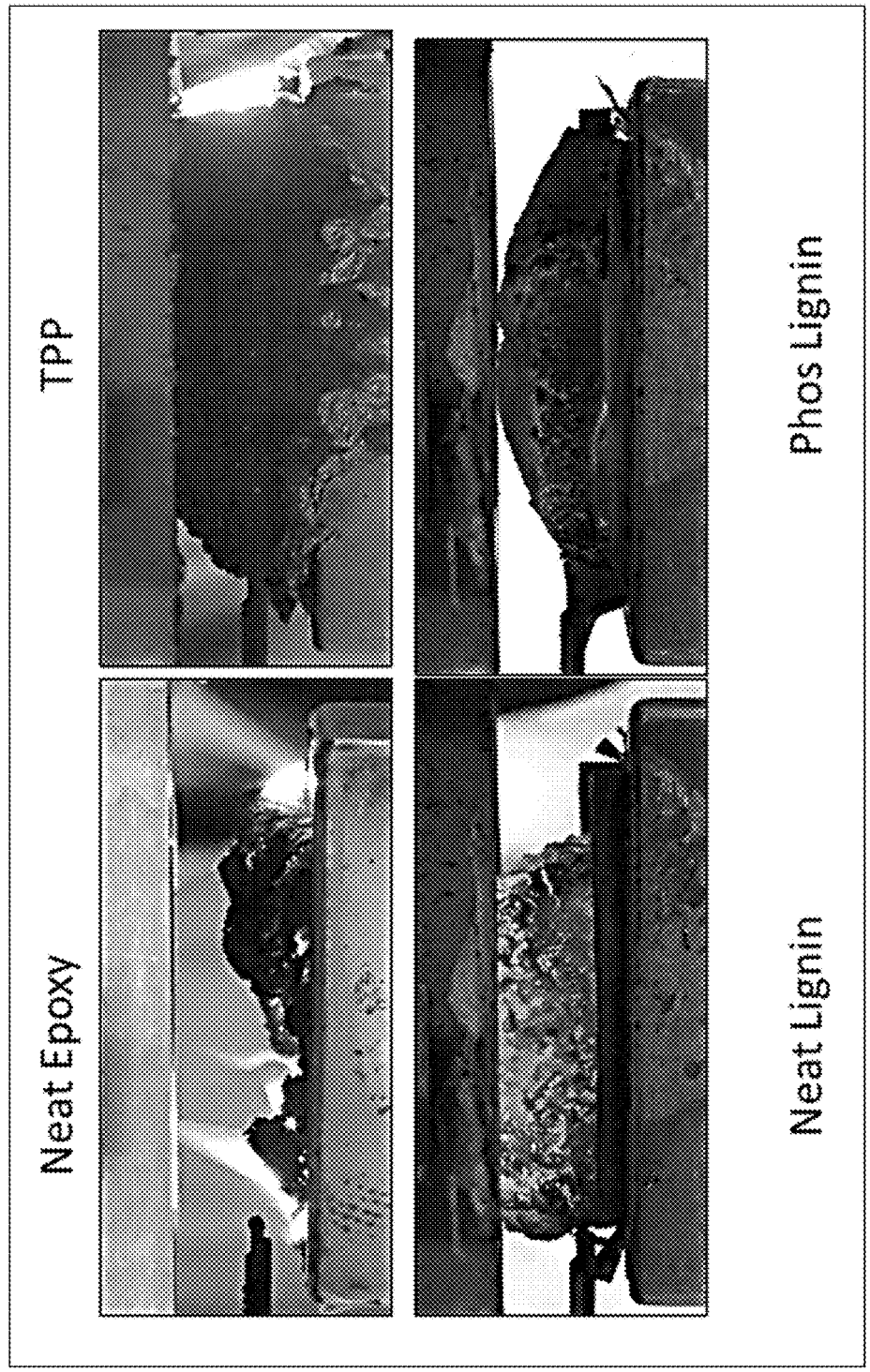
FIG. 15 shows the char morphologies for neat epoxy, TPP, neat lignin, and phosphorylated lignin.
Figure 16A:
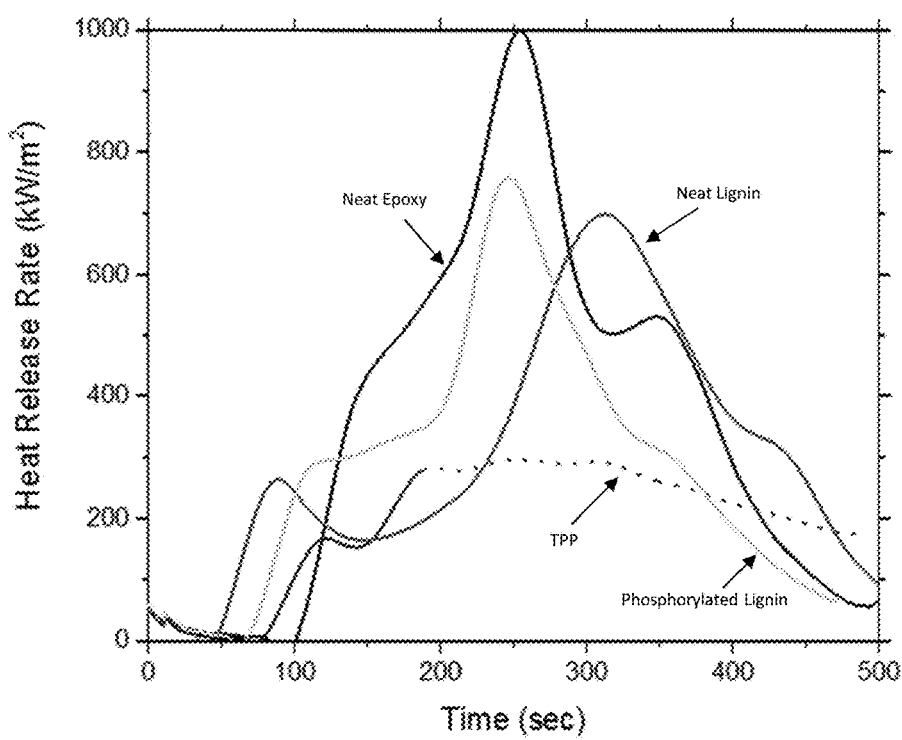
FIG. 16A shows heat release rate versus time for modified samples of neat epoxy, TPP, neat lignin, and phosphorylated lignin.
Figure 16B:
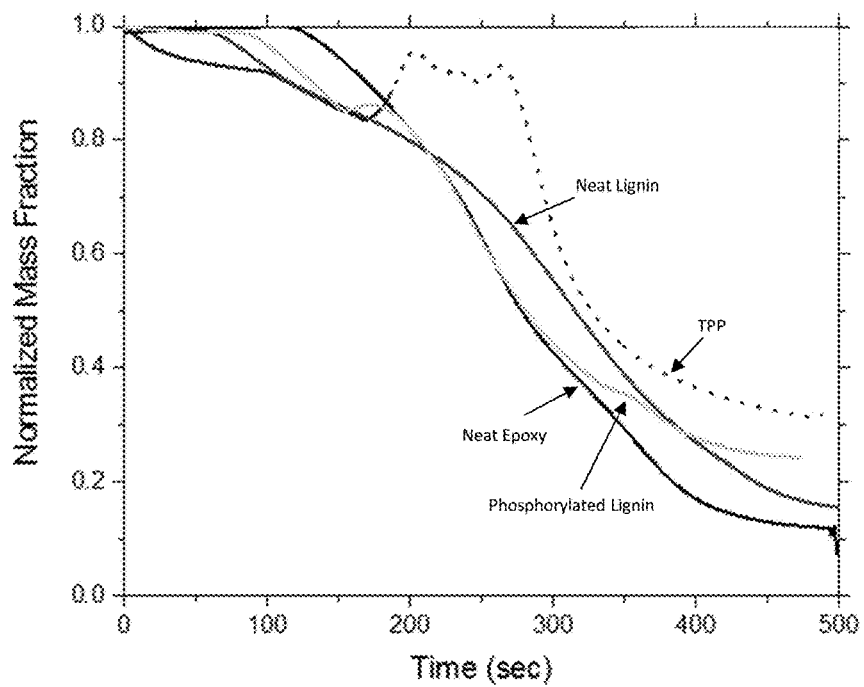
FIG. 16B shows normalized mass fraction versus time for modified samples of neat epoxy, TPP, neat lignin, and phosphorylated lignin.
Figure 17A:
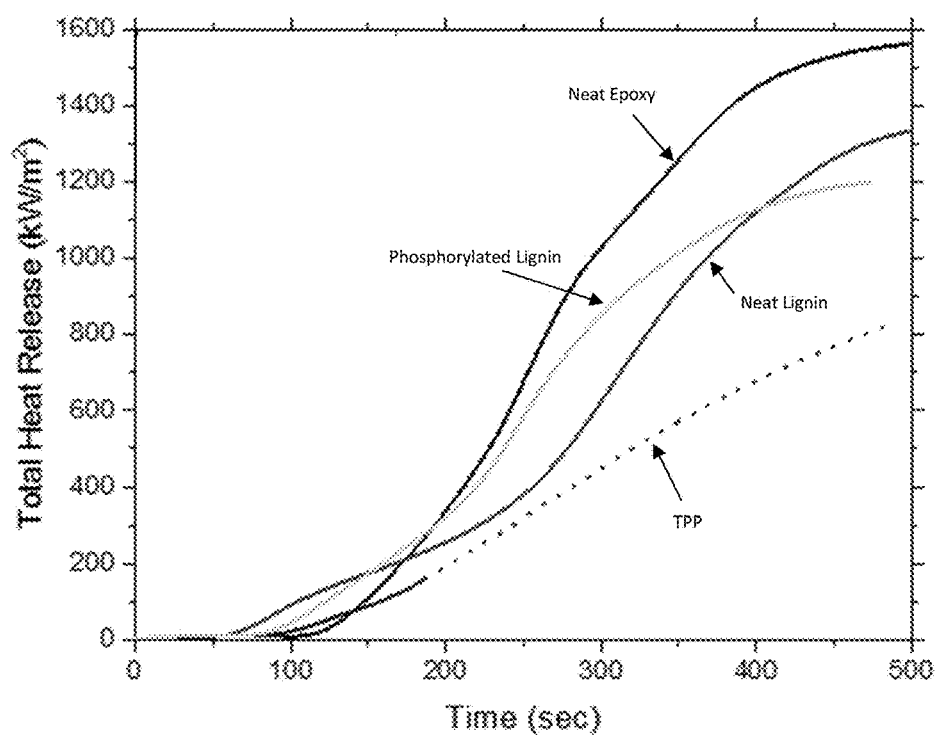
FIG. 17A shows total heat release versus time for modified samples of neat epoxy, TPP, neat lignin, and phosphorylated lignin.
Figure 17B:
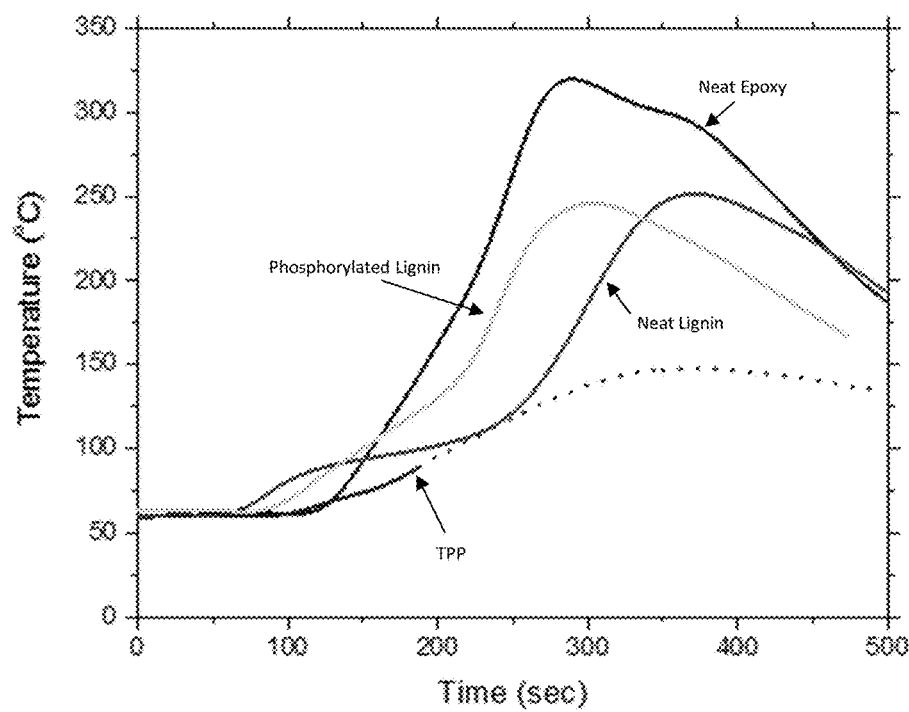
FIG. 17B shows temperature versus time for modified samples of neat epoxy, TPP, neat lignin, and phosphorylated lignin.

FIG. 14 shows images of lignin agglomerates in epoxy (with 20 volume % loading of filler). Still referring to FIG. 14, epoxy and TPP have single phase morphologies. FIG. 15 shows the different char morphologies for neat epoxy, TPP, neat lignin, and phosphorylated lignin. Referring to FIGS. 16A and 16B, burning becomes less intense with phosphorylation. Referring still to FIGS. 16A and 16B, all modified samples show a lowered heat release rate when phosphorylated, an early onset of ignition, lowered peak heat release, and higher remaining mass in the modified samples. Referring to FIGS. 17A and 17B, it is demonstrated that the total amount of heat released is lower in phosphorylated lignin, indicating a better conversion of epoxy to char. In addition, this shows that lignin and phosphorylated lignin are better thermal barriers.

The above serves to demonstrate that flammability performance of epoxy was enhanced through lignin and phosphorylated lignin incorporation. In addition, it should be appreciated that although epoxy was used for demonstrative purposes, such use is not intended to be limiting in nature and rather, other polymers and composites (including wood composites) can be used.

Those skilled in the art will recognize that numerous modifications can be made to the specific implementations described above. The implementations should not be limited to the particular limitations described. Other implementations may be possible. In addition, all references cited herein are indicative of the level of skill in the art and are hereby incorporated by reference in their entirety.

REFERENCES

1. De Chirico, a; Armanini, M.; Chini, P.; Cioccolo, G.; Provasoli, F.; Audisio, G. Flame Retardants for Polypropylene Based on Lignin. *Polym. Degrad. Stab.* 2003, 79, 139-145.
2. Pouteau, C.; Baumberger, S.; Cathala, B.; Dole, P. Lignin-polymer Blends: Evaluation of Compatibility by Image Analysis. *C. R. Biol.* 2004, 327, 935-943.
3. Bernier, E.; Lavigne, C.; Robidoux, P. Y. Life Cycle Assessment of Kraft Lignin for Polymer Applications. *Int. J. Life Cycle Assess.* 2012, 18, 520-528.
4. Hilburg, S. L.; Elder, A. N.; Chung, H.; Ferebee, R. L.; Bockstaller, M. R.; Washburn, N. R. A Universal Route towards Thermoplastic Lignin Composites with Improved Mechanical Properties. *Polymer (Guildf).* 2014, 55, 995-1003.
5. Brizius, G. Phosphonate Substituted Lignin as a Flame Retardant. US 2013/0292615, 2012.
6. Harada, T.; Matsushita, T.; Fukushima, K.; Aoki, D. Flame Retardant Resin Composition and Molded Product. US 2014/0249255 A1.
7. Nikkeshi, S. Agent for Imparting Flame Retardancy to Thermoplastic Resin. U.S. Pat. No. 6,624,258 B1, 2003.
8. Maes, D. Topical Compositions Containing Phosphorylated Polyphenols. US 2008/0095866, 2008.
9. Van Brussel, W.; Schelhens, G.; Ricquier, P. Phosphorylated Polyphenol as Colour Stable Agents. US 2008/0076833, 2008.
10. Cowan, J. C.; Koritala, S.; Warner, K.; List, G. R.; Moulton, K. J.; Evans, C. D. Copper-Hydrogenated Soybean and Linseed Oils: Composition, Organoleptic Quality and Oxidative Stability. *J. Am. Oil Chem. Soc.* 1973, 50, 132-136.

11. Doll, K.; Sharma, B.; Suarez, P. Process to Prepare a Phosphorous Containing Vegetable Oil Based Lubricant Additive. U.S. Pat. No. 8,822,712.
12. Chinese Pat. No. CN 103980470.
13. Japanese Pat. No. JP 2014152313.
14. Chinese Pat. No. CN 103937070.
15. Chinese Pat. No. CN 103897233.
16. Chinese Pat. No. CN 103910850.
17. Chinese Pat. Pub. No. CN 201310754461.
18. Russian Pat. No. RU 2495068 C1 20131010.
19. Chinese Pat. No. CN 103374716.
20. Chinese Pat. No. CN 103436172.
21. Chinese Pat. No. CN 103450762.
22. Chinese Pat. No. CN 103045059.
23. Hitaishi, Susumu; Mitsuyuki, Sato Fujio, Fire-resistant PET compositions (assignee: Tohoku Munekata Co., Ltd., Japan).

The invention claimed is:

1. A flame retardant additive comprising a reaction product of a phosphorylation agent and a demethylation agent pre-treated phenolic macromolecule-containing material selected from the group consisting of tannin, tannic acid, lignin, and any combination thereof, wherein said phenolic macromolecule-containing material is pre-treated with said demethylation agent to generate additional free hydroxyl groups that are capable of reacting with said phosphorylation agent to provide additional phosphate groups, wherein said phosphate groups comprise diphenyl phosphate group:

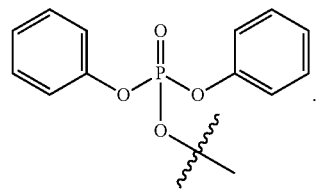 [SMILES: *OP(=O)(Oc1ccccc1)Oc1ccccc1]

2. The flame retardant additive of claim 1, wherein the flame retardant additive is free or substantially free of halogenated materials.

3. A method of preparing the flame retardant additive of claim 1, wherein the method comprises:
   a) providing a demethylating agent to a phenolic macromolecule-containing material to demethylate one or more methoxy group of said phenolic macromolecule-containing material;
   b) reacting the demethylated phenolic macromolecule-containing material obtained from step a) with a phosphorylation agent to provide said flame retardant additive of claim 1.

4. The method of claim 3, wherein the demethylating agent is $BBr_3$, and the phosphorylation agent is diphenyl chlorophosphate.

* * * * *